(12) United States Patent
Coscoy et al.

(10) Patent No.: US 9,164,007 B2
(45) Date of Patent: Oct. 20, 2015

(54) MAGNETIC FLUX COLLECTOR FOR A TORQUE DETECTION DEVICE

(75) Inventors: Elsa Coscoy, Sainte Foy les Lyon (FR); Laurent Rey, Villeurbanne (FR)

(73) Assignee: JTEKT EUROPE (FR)

( * ) Notice: Subject to any disclaimer, the term of this patent is extended or adjusted under 35 U.S.C. 154(b) by 143 days.

(21) Appl. No.: 13/508,139

(22) PCT Filed: Nov. 2, 2010

(86) PCT No.: PCT/FR2010/052343
§ 371 (c)(1),
(2), (4) Date: Jul. 31, 2012

(87) PCT Pub. No.: WO2011/055069
PCT Pub. Date: May 12, 2011

(65) Prior Publication Data
US 2012/0279320 A1    Nov. 8, 2012

(30) Foreign Application Priority Data

Nov. 4, 2009    (FR) ..................................... 09 57789

(51) Int. Cl.
*B29C 45/14*    (2006.01)
*G01L 3/10*    (2006.01)

(52) U.S. Cl.
CPC ............ *G01L 3/104* (2013.01); *B29C 45/1459* (2013.01); *B29C 45/14065* (2013.01); *B29C 45/14467* (2013.01); *B29C 2045/14122* (2013.01); *B29C 2045/14131* (2013.01)

(58) Field of Classification Search
USPC ............ 264/272.19, 272.2, 272.21, 273, 274, 264/275, 277, 279, 279.1, 261, 27.1, 272.11
See application file for complete search history.

(56) References Cited

U.S. PATENT DOCUMENTS

| | | | | |
|---|---|---|---|---|
| 4,553,320 | A * | 11/1985 | Bryant-Jeffries et al. | ...... 29/598 |
| 6,776,058 | B1 * | 8/2004 | Schroeder | ................ 73/862.333 |
| 6,988,422 | B2 | 1/2006 | Sugimura et al. | |
| 2003/0098660 | A1 * | 5/2003 | Erdman et al. | ................ 318/254 |
| 2005/0126309 | A1 | 6/2005 | Nakane et al. | |

FOREIGN PATENT DOCUMENTS

| | | |
|---|---|---|
| EP | 1870684 A1 | 12/2007 |
| FR | 2837282 A1 | 9/2003 |

(Continued)

OTHER PUBLICATIONS

International Search Report issued Feb. 9, 2011 by European Patent Office re: PCT/FR2010/052343; pp. 4; citing: JP 2007-187481 A1, FR 2 845 472 A1, EP 1 870 684 A1.

*Primary Examiner* — Stella Yi
(74) *Attorney, Agent, or Firm* — Cantor Colburn LLP

(57) ABSTRACT

The invention relates to a magnetic flux collector for a torque detection device. The collector includes two coaxial magnetic cylinder heads (6, 7), having respectively interlocked teeth (17, 28), overmolded by means of a plastic material. The two cylinder heads (6, 7) have, at the periphery thereof, notches (18, 19, 23) provided such as to engage with matching grooves (32, 33) which comprise a cylindrical cavity (31) of a mold (30) for overmolding the cylinder heads with the plastic material. The two cylinder heads (6, 7) are therefore positioned in a very accurate manner relative to one another, before injecting the overmolding plastic material. The invention can be used for the production of torque sensors used in the power-steering systems of automobiles.

5 Claims, 3 Drawing Sheets

(56) References Cited

FOREIGN PATENT DOCUMENTS

| FR | 2845472 A1 | 4/2004 |
| FR | 2845472 | * 9/2004 |
| FR | 2872902 A1 | 1/2006 |
| JP | 2007-187481 A1 | 7/2007 |

* cited by examiner

MAGNETIC FLUX COLLECTOR FOR A TORQUE DETECTION DEVICE

TECHNICAL FIELD

The present invention generally relates to the technical field of a steering systems for motor vehicles, and more particularly, steering systems which comprise a device for detecting torque, used for measuring the torque exerted by the driver of the vehicle on the steering wheel, with view to electrically or hydraulically assisting the movements of the steering system, in other words the movements for orienting the steered wheels of the relevant vehicle. Even more particularly, this invention relates to a method for making a magnetic flux collector for such a torque detection device.

BRIEF DISCUSSION OF RELATED ART

In an assisted steering system, the assisting torque or force provided for relieving the driver of the vehicle, is controlled according to the torque exerted by the driver on the steering wheel, which requires the presence of a torque sensor on the wheel, from which the intensity of the assistance action is controlled. Among the torque sensors which may be used, the most common sensors use the change in the angle of a torsion bar. A more particular category of torque detection devices, notably used in electrically-assisted steering systems, comprises sensors operating on a magnetic principle, such as the sensors described in patent documents FR 2 837 282 A1, FR 2 872 902 A1, US 2005/0126309 A1 and U.S. Pat. No. 6,988, 422 B2.

With reference to FIG. 1 of the appended schematic drawing, a torque sensor of this kind is inserted between an input rotary shaft 2 and an output rotary shaft 3, mechanically connected through a torsion bar 4, and itself consists of four main elements, which are:
- a set of permanent magnets 5 firmly attached to the end of the input shaft 2,
- a pair of magnetic cylinder heads 6 and 7 overmolded by a plastic material 8 and forming a magnetic flux collector 9, firmly attached to the end of the output shaft 3 via an attachment ring (not shown),
- a flux concentrator support 10, consisting of two collecting rings 11 and 12 overmolded by a plastic material and surrounded by an electromagnetic shield (not shown),
- a magnetic flux sensor 13, consisting of two elementary Hall effect sensors 14 and 15 overmolded by a plastic material and comprising an electromagnetic shield (not shown).

The EP 1 870 684 A1 patent document describes a process for obtaining a magnetic flux collector, consisting of a pair of magnetic cylinder heads and of an attachment ring overmolded by a plastic material.

The main requirement of the process for obtaining the magnetic flux collector is to achieve accurate angular positioning of both magnetic cylinder heads relatively to each other and also accurate angular positioning of the pair of magnetic cylinder heads relatively to the attachment ring. The EP 1 870 684 A1 patent document for this purpose proposes the use of two needles placed in the molding cavity of the injection tool, in order to localize the pair of magnetic cylinder heads by means of positioning holes suitably located on both cylinder heads. The two cylinder heads are placed one after the other in the molding cavity of the injection tool, while being angularly positioned by both needles. The overmolding material is then injected, in order to join both cylinder heads and thereby obtain the flux collector.

This known process has the drawback of being delicate to apply and insufficiently accurate.

In order not to perturb the magnetic flux, the positioning holes made in the cylinder heads should have a reduced size, in particular a very small diameter. The two needles therefore also have themselves a very small diameter, comparatively to their length, for example a diameter of the order of 1 millimeter for a length of the order of 15 millimeters. Therefore, both needles are fragile on the one hand, their life-time in an industrial production being limited, which is detrimental to the efficiency of the manufacturing method and increases its cost. On the other hand, both of these needles are made flexible which is detrimental to the accuracy of the angular positioning of one cylinder head relatively to the other.

BRIEF SUMMARY

The present invention aims at finding a remedy to these drawbacks, and for this purpose, it proposes an improved method with which a magnetic flux collector may be made with accurate and robust positioning of the two magnetic cylinder heads relatively to each other.

This problem is solved for a magnetic flux collector of the type relevant here, i.e. comprising an attachment ring and two coaxial magnetic cylinder heads with respective interlocked teeth overmolded by a plastic material, by a manufacturing method which comprises:
- providing an overmolding mold, including a globally cylindrical cavity provided on its lateral surface with at least one axially oriented rib,
- coaxially introducing into the cavity of the overmolding mold, two magnetic cylinder heads each having, at their periphery, at least one notch, radially open outwards, at least one notch of each cylinder head being engaged on a rib of said cavity so as to angularly position both cylinder heads and
- injecting into said cavity the overmolding plastic material.

The ribs of the cavity of the overmolding mold provide very accurate angular positioning of both magnetic cylinder heads, these ribs are not fragile and have zero flexibility.

Advantageously, said or each rib of the cavity of the overmolding mold has, on the open side of this cavity, a beveled end, this in order to facilitate the placement of the magnetic cylinder heads in said cavity.

The invention also provides a magnetic flux collector manufactured by the method which has just been indicated, the collector comprising an attachment ring and two coaxial magnetic cylinder heads with respective interlocked teeth overmolded by a plastic material, this collector being characterized by the fact that both magnetic cylinder heads each have at their periphery, at least two notches with at least one notch substantially aligned on the top of a tooth of the cylinder head and at least one other notch substantially aligned on the middle point between two consecutive teeth of the cylinder head.

Each magnetic cylinder head advantageously has a total of four notches, with two diametrically opposite first notches respectively aligned on the tops of two teeth themselves diametrically opposite to the cylinder head, and with two other diametrically opposite notches, each aligned on the middle point between two consecutive teeth of the cylinder head.

The angular shift between both pairs of notches is thus equal to an odd multiple of the angular shift between a top and an immediately consecutive recess between teeth of each cylinder head. Accordingly, both cylinder heads may be positioned head to foot with an angular shift allowing their respective teeth to be interlocked with each other. It will be noted that, if each cylinder head includes two pairs of diametrically opposite notches, it is sufficient to provide in the mold a total of two ribs, which cooperate with a pair of notches of one of the cylinder heads, and with a pair of notches of the other cylinder head.

The width and the depth of the notches have to be as thin as possible, in order to limit the perturbation which these notches generate in the magnetic fluxes which, during operation of the flux collector, pass through the cylinder heads. As an example, for magnetic cylinder heads having an outer diameter of 40 millimeters, notches with a general trapezoidal shape having a width of 1.5 millimeters and a depth of 1.5 millimeters give the possibility of obtaining a variation in the collected magnetic flux which remains less than 5%, which should be considered as satisfactory.

Alternatively, notches with a rectangular, triangular or semi-circular shape may also be contemplated. In every case, the ribs formed in the cavity of the mold should have a section mating the shape of the notches, but reduced by a suitably selected play in order to allow easy placement of the cylinder heads in the mold, while retaining great accuracy in the angular positioning of one cylinder head relatively to the other, this accuracy may be of the order of ±0.5°.

BRIEF DESCRIPTION OF THE DRAWINGS

The invention will be better understood by means of the following description, with reference to the appended schematic drawing illustrating as an example an embodiment of this magnetic flux collector and illustrating its manufacturing method.

DETAILED DESCRIPTION

Figure 2:
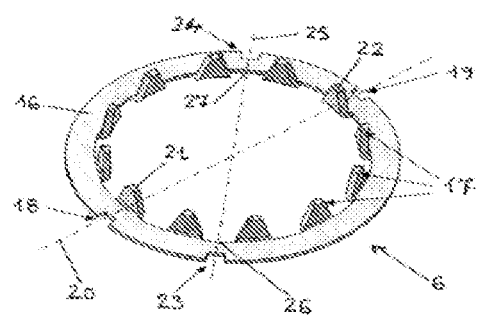
FIG. 2 is a perspective view of a magnetic cylinder head belonging to a flux collector made according to the present invention.

In FIG. 2, is illustrated a magnetic cylinder head 6 of a flux collector which is the lower cylinder head. The magnetic cylinder head 6, with a general annular shape, has a peripheral flange 16 on the inner edge of which teeth 17 in an even number, regularly spaced out, are formed, which are folded upwards (with reference to the figure).

On the outer edge of the peripheral flange 16, two first notches 18 and 19 with a trapezoidal shape are made, centered on a same diametrical line 20 which is itself aligned on the tops 21 and 22 of two diametrically opposite teeth 17.

On the outer edge of the peripheral flange 16, two other notches 23 and 24 with a trapezoidal shape are made, centered on another diametrical line 25 which is itself aligned on the middle points 26 and 27 of two consecutive teeth 17.

The other magnetic cylinder head 7, which is the upper cylinder head, has a similar configuration, its teeth 28 being however folded downwards (with reference to the drawing) in order to be interlocked between the teeth 17 of the first magnetic cylinder head 6.

Figure 1:
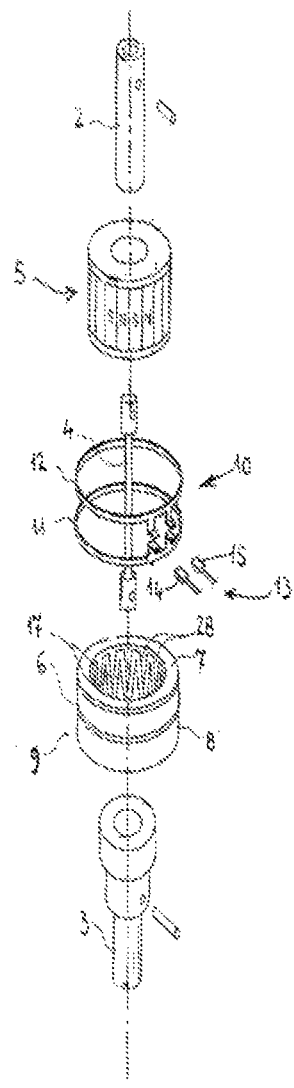
FIG. 1 (already mentioned) is a perspective exploded view of a torque detection device, to which the present invention may be applied.

The flux collector 9 further comprises an attachment ring (not visible in the drawing) and overmolding in a plastic material 8 which connects the attachment ring 29 and both magnetic cylinder heads 6 and 7 (see FIG. 1).

Figure 3:
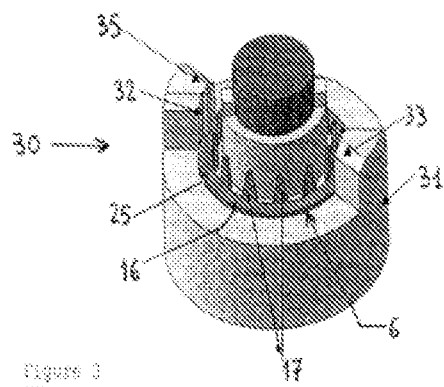
FIGS. 3, 4 and 5 are diagrams which illustrate successive steps of the method for making this flux collector.
Figure 4:
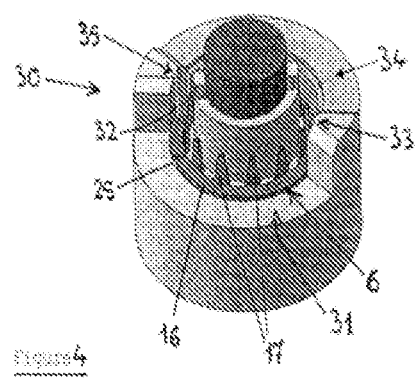
Figure 5:
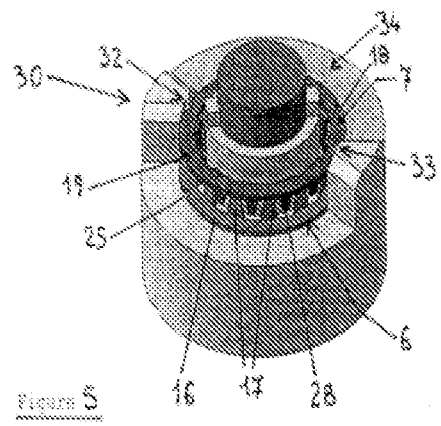

With reference to FIGS. 3 to 5, the means and the process for placing both magnetic cylinder heads 6 and 7 and for overmolding these cylinder heads 6 and 7 by the plastic material 8 will now be described.

FIG. 3 shows a portion of an injection mold 30 used for overmolding the cylinder heads, this portion delimiting a cavity 31 with a general cylindrical shape. On the side wall of the cavity 31, are formed two ribs 32 and 33, axially oriented, diametrically opposite and with a horizontal section mating the shape of the notches of the magnetic cylinder heads. Ribs 32 and 33 are formed in fixed areas of the cavity 31, areas which are located between two opposite lateral slides 34, only one of which is visible in FIGS. 4 and 5. The upper ends 35 of both ribs 32 and 33 are beveled.

FIG. 3 also illustrates the placement of the lower magnetic cylinder head 6 into the cavity 31. The cylinder head 6 is introduced so that its first two notches 18 and 19 respectively engage on both ribs 32 and 33, the beveled upper ends 35 of the ribs facilitating the insertion of the cylinder head 6 into the cavity 31.

Next, as shown in FIG. 4, it is proceeded with the closing of the lateral slides 34. These slides give the possibility of obtaining an accurate axial gap between both cylinder heads 6 and 7.

FIG. 5 illustrates the placement of the upper magnetic cylinder head 7 in the cavity 31 of the injection mold 30. The same ribs 32 and 33 then engage into the other notches 23 and 24 of this cylinder head 7, positioned in a turned-over position and angularly shifted relatively to the lower cylinder head 6.

Both cylinder heads 6 and 7 are thus angularly positioned accurately relatively to each other, by means of the two ribs 32 and 33 which cooperate with two of the four notches of each cylinder head 6 or 7. It is then proceeded with the operation of injecting the plastic material 8, which will coat both cylinder heads 6 and 7 and will bind them definitively.

There would be no departure from the scope of the invention, as defined in the appended claims:
  upon changing the number of notches made in both magnetic cylinder heads,
  upon changing the shape of these notches, which may also be rectangular, triangular or semi-circular,
  upon changing the details of the overmolding mold used for making the magnetic flux collector,
  upon intending this magnetic flux collector for forming torque detection devices which may be used in assisted steering systems of any type.

The invention claimed is:

1. A method for manufacturing a magnetic flux collector for a torque detection device, the magnetic flux collector comprising an attachment ring and two coaxial magnetic cylinder heads with respective interlocked teeth and overmolded by a plastic material, the method including the following steps:
  providing an overmolding mold, including a globally cylindrical cavity provided, on its lateral surface, with at least one axially oriented rib,
  coaxially introducing, into the cavity of the overmolding mold, two magnetic cylinder heads, each cylinder head having an inner edge and an outer edge, wherein teeth are formed on the inner edge, wherein each cylinder head further includes at its periphery, on the outer edge, at least one notch radially open outwards, at least one notch of each cylinder head being engaged on a rib of said cavity so as to angularly position both cylinder heads, and
  injecting into said cavity the plastic overmolding material.

2. The method according to claim 1, wherein said or each rib of the cavity of the overmolding mold has on the open side of this cavity, a beveled end.

3. The method according to claim 1, including the following steps: providing at least two notches in the periphery of each magnetic cylinder head, with at least one notch being substantially aligned with the top of a tooth of the cylinder head and at least one other notch substantially aligned on the middle point between two consecutive teeth of the cylinder head.

4. The method according to claim 3, wherein each magnetic cylinder head has a total of four notches, with two diametrically opposite first notches, respectively aligned on the tops of two teeth of the cylinder head, said two teeth being also diametrically opposite one with respect to the other, and with two other diametrically opposite notches, each aligned on the middle points between two consecutive teeth of the cylinder head.

5. The method according to claim 1, wherein the notches of the cylinder heads have a general trapezoidal shape.

\* \* \* \* \*